(12) United States Patent
Nakabayashi et al.

(10) Patent No.: US 7,962,972 B2
(45) Date of Patent: Jun. 21, 2011

(54) HEAD MOUNTED DEVICE AND HEAD MOUNTED SYSTEM

(75) Inventors: Takaaki Nakabayashi, Ohta-ku (JP); Yoshihiro Saito, Hachioji (JP)

(73) Assignee: Canon Kabushiki Kaisha (JP)

( * ) Notice: Subject to any disclaimer, the term of this patent is extended or adjusted under 35 U.S.C. 154(b) by 1657 days.

(21) Appl. No.: 11/240,265

(22) Filed: Sep. 29, 2005

(65) Prior Publication Data

US 2006/0070168 A1   Apr. 6, 2006

(30) Foreign Application Priority Data

Oct. 1, 2004   (JP) .................................. 2004-290103

(51) Int. Cl.
*A42B 7/00*   (2006.01)

(52) U.S. Cl. ........................................................... 2/421

(58) Field of Classification Search ...... 2/410, 411–416, 2/425, 450, 453, 421; 351/158
See application file for complete search history.

(56) References Cited

U.S. PATENT DOCUMENTS

| | | | | |
|---|---|---|---|---|
| 5,044,019 A | * | 9/1991 | Shewchenko et al. | 2/421 |
| 5,313,671 A | * | 5/1994 | Flory | 2/428 |
| 5,671,037 A | * | 9/1997 | Ogasawara et al. | 351/158 |
| 5,696,521 A | * | 12/1997 | Robinson et al. | 345/8 |
| 5,812,224 A | * | 9/1998 | Maeda et al. | 349/13 |
| 7,120,939 B1 | * | 10/2006 | Howard et al. | 2/416 |
| 7,480,133 B2 | * | 1/2009 | Nakabayashi et al. | 345/8 |

FOREIGN PATENT DOCUMENTS

| | | |
|---|---|---|
| JP | 11-119148 A | 4/1999 |
| JP | 11-298826 | 10/1999 |

* cited by examiner

*Primary Examiner* — Tejash Patel
(74) *Attorney, Agent, or Firm* — Rossi, Kimms & McDowell LLP

(57) ABSTRACT

Provided is a head mounted device that can be smoothly mounted onto a head. The head mounted device includes: a frame extending from a front head side to a back head side in a mounted state onto a head; and a head holding portion attached to the frame and provided with a pad pressed to the head; in which the head holding portion, in a non-mounted state in which the device is not mounted to the head, holds the pad such that the pad is opened toward a direction in which the head mounted device is mounted onto the head as compared to the mounted state onto the head.

9 Claims, 8 Drawing Sheets

HEAD MOUNTED DEVICE AND HEAD MOUNTED SYSTEM

BACKGROUND OF THE INVENTION

1. Field of the Invention

The present invention relates to a mounting structure of a head mounted device onto a head.

2. Related Background Art

FIG. 13 and FIG. 14 each show a mounting mechanism provided to a conventional head mounted display (hereinafter referred to as HMD) and the like.

The conventional HMD is provided with a front head pressing pad 22 abutting onto a front head of a wearing person, a back head pressing pad 24 abutting onto a back head, a pad mounting member 25 for retaining the back head pressing pad 24, and a frame 23 for connecting the pad mounting member 25 and the front head pressing pad 22.

Here, it is possible to mount the HMD onto the head by adjusting the distance between the front head pressing pad 22 and the back head pressing pad 24 by using a length adjusting mechanism 26. Besides, the wearing person of the HMD can observe an image displayed on a display unit 21.

In addition, in the HMD, as shown in FIG. 14, by pressing a back head pressing portion 34 onto the back head of the wearing person by using a bias force of a spring 35, a position of a display unit 31 is prevented from being lowered by its weight M (see, for example, Japanese Patent Application Laid-Open No. H11-298826). Besides, in the HMD, a front head pressing portion 33 is pressed onto the front head of the wearing person by the bias force of a spring 32.

In the conventional mounting mechanism, it is possible to mount the HMD while confirming a status (direction and the like) of the front head pressing portion because the front head pressing portion is located on the front head side. However, it is not possible to confirm a status (direction and the like) of the back head pressing portion in mounting the HMD because the back head pressing portion is located on the back head side.

Especially, in a case where the frame connecting the front head pressing portion and the back head pressing portion is made of a relatively soft material with flexibility, if the back head pressing portion is hooked on the back head when mounting the HMD, a back head pressing portion 41 is rotated in a direction indicated by an arrow I as shown in FIG. 15. As a result, a connecting portion 43 which is connected to a frame 42 and supports the back head pressing portion 41 is rotated in a direction indicated by an arrow H in FIG. 15.

In this case, if the wearing person tries wearing the HMD by force without recognizing that the back head pressing portion 41 is rotated, the HMD is mounted on a head with the back head pressing portion 41 being reversely rotated.

On the other hand, if the HMD as disclosed in Japanese Patent Laid-Open No. H11-298826 is not mounted on a head, the back head pressing portion 34 is rotated by a predetermined amount in a direction indicated by an arrow T2 due to the bias force of the spring 35, as compared to a state shown in FIG. 14.

When mounting the HMD in the state like this, it is necessary to rotate the back head pressing portion 34 in a direction opposite to the direction indicated by the arrow T2 against the bias force of the spring 35 so as to prevent the back head pressing portion 34 from being hooked on the head of the wearing person. Alternatively, it is necessary to mount the HMD in a state where the distance between the front head pressing portion 33 and the back head pressing portion 34 is made sufficiently longer than the width of the head.

As described above, in the case of the conventional HMD, the wearing person has to perform a mounting operation while being aware of the status of the back head pressing portion, which gives inconvenience to the wearing person.

SUMMARY OF THE INVENTION

A head mounted device according to an example of the present invention includes: a frame extending from a front head side to a back head side in a mounted state onto a head; and a head holding portion attached to the frame and provided with a pad pressed to the head. The head holding portion, in a non-mounted state in which the device is not mounted onto the head, holds the pad such that the pad is opened toward a direction in which the head mounted device is mounted onto the head as compared to the mounted state.

A head mounted device according to another example of the present invention includes: a frame extending from a front head side to a back head side in a mounted state onto a head; and a head holding portion attached to the frame and provided with a pad pressed to the head. The head holding portion includes a guide member for guiding the pad to a pressing position on the head in a process of mounting the device onto the head.

DETAILED DESCRIPTION OF THE PREFERRED EMBODIMENTS

Hereinafter, embodiments of the present invention are explained.

First Embodiment

Figure 1A:
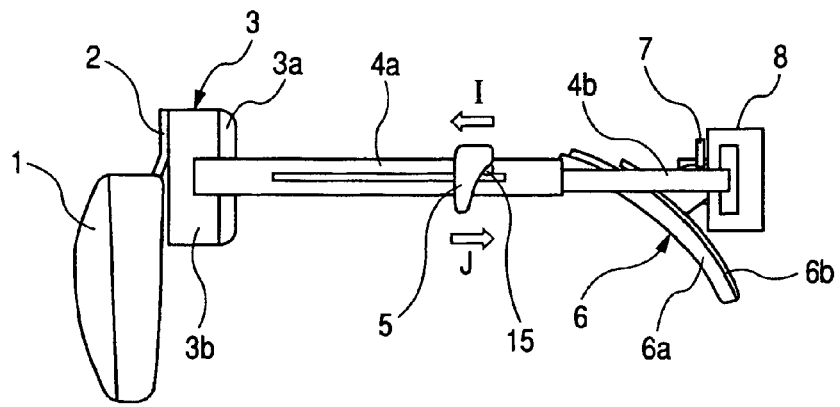
FIG. 1A is a side view of a head mounted display which is a first embodiment of the present invention and FIG. 1B is a schematic block diagram of the display unit.
Figure 1B:
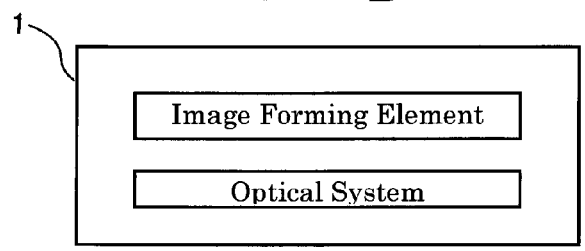
Figure 2:
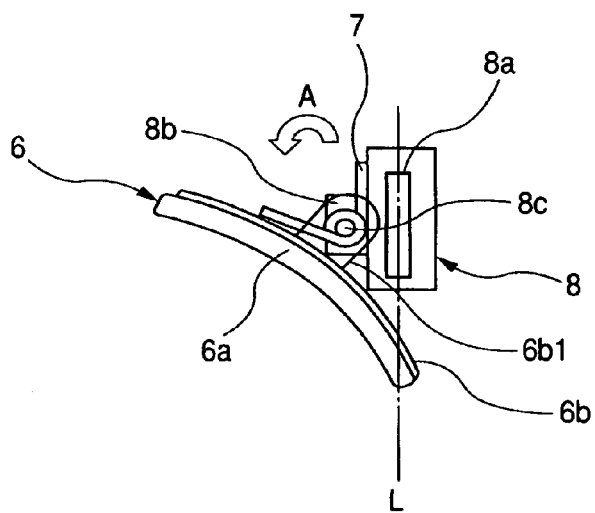
FIG. 2 is a side view of a back head pressing portion according to the first embodiment.
Figure 3:
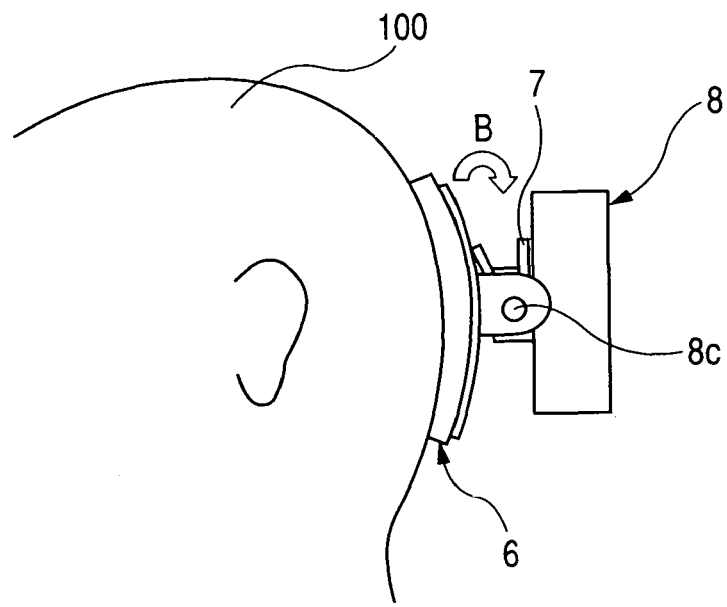
FIG. 3 is a side view showing a mounted state of the back head pressing portion according to the first embodiment.
Figure 4A:
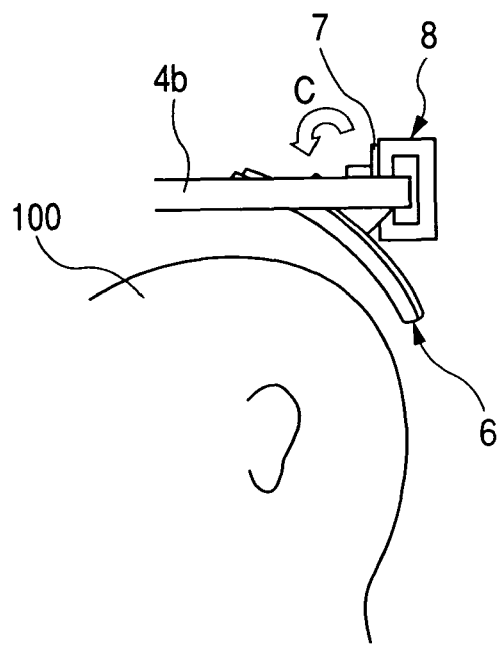
FIGS. 4A and 4B are views explaining a movement in mounting the back head pressing portion according to the first embodiment.
Figure 4B:
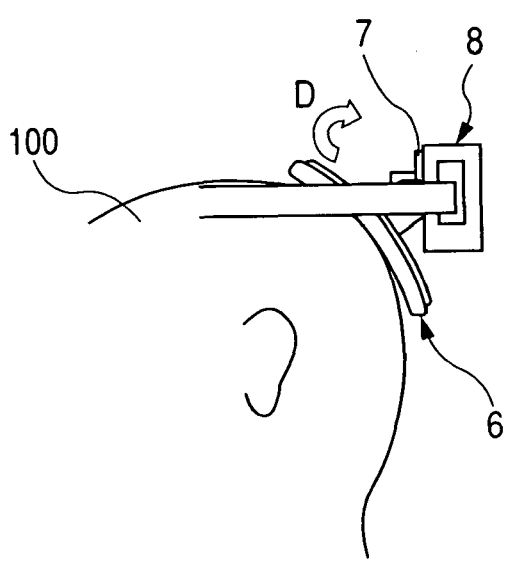

FIG. 1A is a side view of a head mounted system (HMD) which is a first embodiment of the present invention. FIG. 1B is a schematic block diagram of the display unit. FIG. 2 is a side view of a back head pressing portion (head holding portion), and FIG. 3 is a side view of the back head pressing portion in a mounted state. FIG. 4A and FIG. 4B are views showing the movement of the back head pressing portion in a process of mounting the HMD.

A front head pressing portion 3 is provided with a front head pad mounting base 3b formed in a shape conforming to a shape of the front head of a wearing person wearing the HMD; and a front head pressing pad 3a mounted onto the front head pad mounting base 3b. The front head pressing pad 3a abuts on a front head of the wearing person when the HMD is mounted.

A back head pressing portion 6 is provided with a back head pad mounting base 6b formed in a shape conforming to a shape of the back head of the wearing person wearing the HMD and a back head pressing pad 6a mounted onto the back head pad mounting base 6b. The back head pressing pad 6a abuts on a back head of the wearing person when the HMD is mounted.

A display unit (head mounted instrument) 1 is supported to be held onto the front head pad mounting base 3b via a supporting member 2. As schematically illustrated in FIG. 1B, the display unit 1 is provided with: an image forming element such as a liquid crystal panel for forming an image thereon in accordance with an input signal from an external device (such as a video cassette recorder and a personal computer); and an optical system through which the wearing person can observe the image formed by the image forming element. A first frame 4a, which is extended from the front head side of the wearing person to the back head side in a mounted state of the HMD, is connected to both ends of the front head pad mounting base 3b. In addition, a second frame 4b is connected to the first frame 4a via a ratchet type length adjusting mechanism 5. The second frame 4b is connected to a connecting portion 8a of a pad holding member 8.

Here, the first frame 4a and the second frame 4b are connected to each other via the length adjusting mechanism 5. Therefore, the second frame 4b can be freely moved in a direction indicated by an arrow I with respect to the first frame 4a but cannot be moved in a direction indicated by an arrow J with respect to the first frame 4a. That is, the second frame 4b is locked when moved to the direction indicated by the arrow J.

When a lock release button 15 of the length adjusting mechanism 5 is pressed to release the locked state of the second frame 4b with respect to the first frame 4a, and it becomes possible to move the second frame 4b in the direction indicated by the arrow J with respect to the first frame 4a.

In other words, by changing a position of the second frame 4b with respect to the first frame 4a by using the length adjusting mechanism 5, it is possible to change a distance between the front head pressing portion 3 and a back head pressing portion 6. Accordingly, it is possible to press the front head pressing portion 3 (the front head pressing pad 3a) and the back head pressing portion 6 (the back head pressing pad 6a) against a head 100 of the wearing person with a constant pressing force so as to fix the HMD onto the head 100 regardless of the size of the head of the wearing person.

A protruding portion 6b 1 of the back head pad mounting base 6b is engaged in a rotational shaft 8c formed on a supporting portion 8b of the pad holding member 8, which makes the back head pad mounting base 6b rotatable with respect to the pad holding member 8.

In addition, a bias spring (bias unit) 7 is mounted onto the rotational shaft 8c, and one end of the bias spring 7 abuts on the pad holding member 8 and the other end of the bias spring 7 abuts on the back head pad mounting base 6b. Here, a bias force of the bias spring 7 acts in a direction indicated by an arrow A in FIG. 2.

When the HMD is in the non-mounted state, an abutting surface (a mounting surface) of the back head pressing pad 6a is oriented to a downward direction (the direction in which the HMD is mounted) in FIG. 2 due to the bias force of the bias spring 7 applied to the back head pressing portion 6, which leads to a state in which the back head pressing portion 6 is opened with respect to the head 100 of the wearing person. Here, in the non-mounted state of the HMD, as shown in FIG. 2, a part of the back head pad mounting base 6b abuts on an edge portion of the pad holding member 8, and the back head pressing portion 6 is inclined by a predetermined angle with respect to the direction of mounting mentioned above.

Also, in the non-mounted state of the HMD, one end of the back head pressing portion 6, namely an edge portion located on a lower side of the head 100 in the mounted state shown in FIG. 3 is located on a straight line L in FIG. 2 or on an opposite side of the pad holding member 8b (a right side of FIG. 2) with respect to the straight line L. Here, the straight line L is a line orthogonal to a plane including the second frame 4b in the connecting portion 8a of the pad holding member 8.

Note that a line passing through the rotational shaft 8c and being orthogonal to a plane including the second frame 4b may be used, instead of the straight line L mentioned above, as a reference in determining the position of one end of the back head pressing portion 6.

On the other hand, in the mounted state of the HMD, one end of the back head pressing portion 6 is located on the side of the pad holding member 8b (left side in FIG. 2) with respect to the straight line L.

As described above, in the non-mounted state of the HMD, the back head pressing portion 6 is opened so that the back head pressing portion 6 is rotated in a direction indicated by an arrow C in FIG. 4A even when the distance between the front head pressing portion 3 and the back head pressing portion 6 is so small that the back head pressing pad 6a touches the head 100 (on the side of a top of the head). Therefore, the back head pressing portion 6 does not rotate in a direction opposite to the direction indicated by the arrow C in mounting the HMD.

Here, in a case where the distance between the front head pressing portion 3 and the back head pressing portion 6 is small with respect to the head 100, the lock release button 15 is operated to increase the distance, thereby making it possible to mount the HMD onto the head 100.

With the above-described configuration, a situation can be prevented in which the HMD is improperly mounted with the back head pressing portion 6 being reversed, that is, an abutting surface of the back head pressing pad 6a being not oriented to the side of the head 100. As a result, it is possible to easily and smoothly mount the HMD onto the head 100. In addition, it is not necessary to confirm the status (direction and the like) of the back head pressing portion 6.

On the other hand, in mounting the HMD, the back head pressing pad 6a abuts on the head 100 as shown in FIG. 4B to rotate in a direction indicated by an arrow D in FIG. 4B against the bias force of the bias spring 7, in accordance with the movement of the HMD in the direction of mounting (to a downward direction in FIG. 4B). When the HMD has been completely mounted, the back head pressing pad 6a securely presses the back head conforming to the shape of the back head of the wearing person as shown in FIG. 3.

When the HMD is in the completely-mounted state, the bias spring 7 is charged to a direction indicated by an arrow B in FIG. 3, and the back head pressing pad 6a presses the back head of the wearing person by the distance between the front head pressing portion 3 and the back head pressing portion 6 and by the bias force of the bias spring 7.

Second Embodiment

Figure 5:
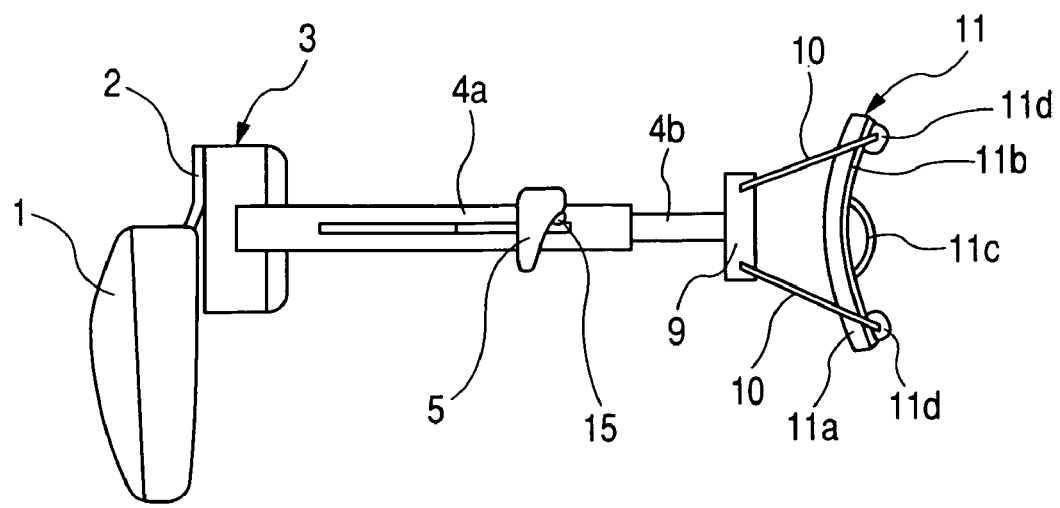
FIG. 5 is a side view of the head mounted display which is a second embodiment of the present invention.
Figure 6:
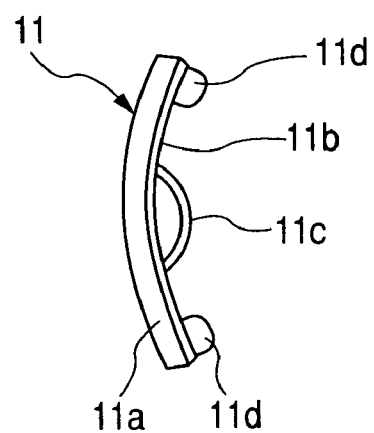
FIG. 6 is a side view of the back head pressing portion according to the second embodiment.
Figure 7:
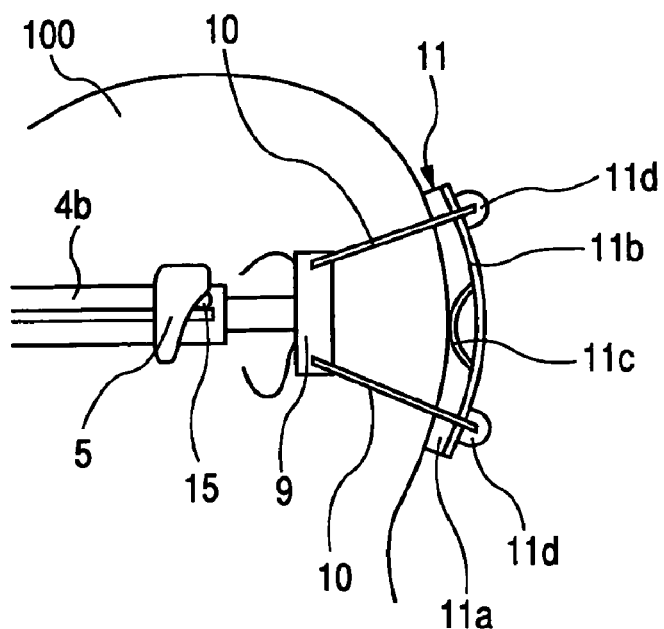
FIG. 7 is a side view showing the mounted state of the back head pressing portion according to the second embodiment.

FIG. 5 is a side view of the head mounted display (HMD) which is a second embodiment of the present invention, FIG. 6 is a side view of the back head pressing portion (head holding portion), and FIG. 7 is a side view showing a part of the HMD in the mounted state. In these drawings, the like numerals and symbols are used for the members which are the same as the members of the first embodiment, and the explanation thereof is omitted.

A back head pressing portion 11 is provided with a back head pad mounting base 11b and a back head pressing pad 11a mounted onto the back head pad mounting base 11b. The back head pressing pad 11b is made of a deformable material.

In addition, the back head pressing portion 11 has a leaf spring 11c. When the HMD is in a state (non-mounted state) as shown in FIG. 5, the leaf spring 11c is protruded in a convex shape toward a direction opposite to the side of the back head pressing pad 11a. The back head pressing portion 11 (the back head pad mounting base 11b and the back head pressing pad 11a) is deformed by the leaf spring 11c so as to have a curved surface.

Further, the back head pressing portion 11 is provided with a belt mounting portion 11d to which a belt 10 is mounted. The belt mounting portion 11d is connected to a belt connecting portion 9 via the belt 10. The belt connecting portion 9 is provided to the edge portion of the second frame 4b.

The belt 10 is flexible with respect to the force acting in a longitudinal (horizontal) direction, but is not flexible with respect to the force acting in a direction orthogonal to the longitudinal direction.

When the HMD is in the non-mounted state, as shown in FIG. 5 and FIG. 6, the back head pad mounting base 11b is deformed so that a mounting surface on the side of the back head pressing pad 11a is protruded in the convex shape, in other words, so that a surface opposite to the mounting surface is recessed in a concave shape.

That is, the abutting surface of the back head pressing pad 11a is open to the head 100 of the wearing person. Therefore, and in mounting the HMD onto the head 100 of the wearing person, it is possible to smoothly mount the HMD without the back head pressing portion 11 being hooked on the head 100. In addition, in mounting the HMD, it is not necessary to confirm the status (direction and the like) of the back head pressing portion 11.

After moving the HMD which is in a state shown in FIG. 5 to a predetermined position (a mounting position) with respect to the head 100, a position of the second frame 4b is adjusted with respect to the first frame 4a by using the length adjusting mechanism 5. As a result, the belt mounting portion 11d is pulled via the belt connecting portion 9 and the belt 10, which leads to a deformation of the back head pressing portion 11. That is, a center region of the back head pressing pad 11a is pushed in by the head 100 of the wearing person and thus the back head pressing pad 11a and the back head pad mounting base 11b are deformed so as to conform to the back head of the wearing person as shown in FIG. 7.

At this time, the leaf spring 11c is protruded on the side of the back head pressing pad 11a. In addition, the abutting surface of the back head pressing pad 11a becomes recessed to be the concave shape.

In the above-described manner, the back head pressing pad 11a presses the back head of the wearing person so that the HMD is fixed onto the head 100 of the wearing person.

Third Embodiment

Figure 8:
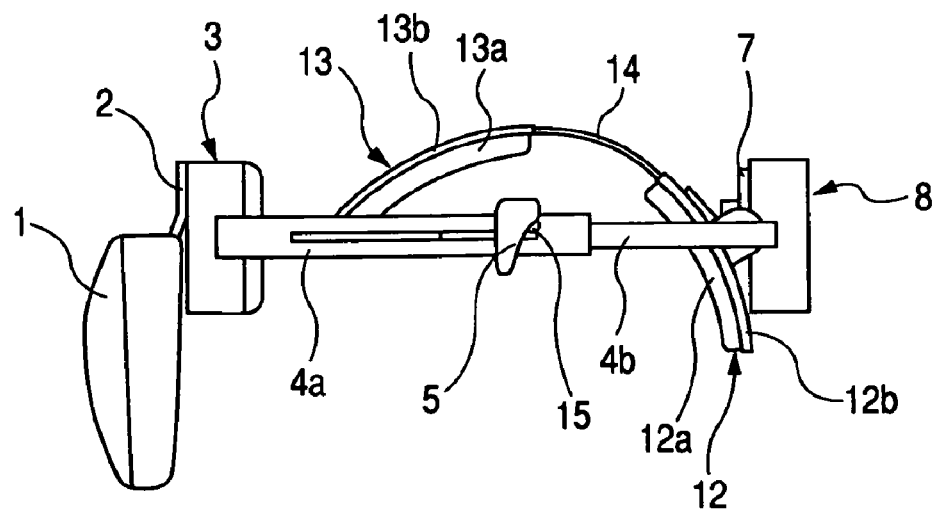
FIG. 8 is a side view of the head mounted display which is a third embodiment of the present invention.
Figure 9:
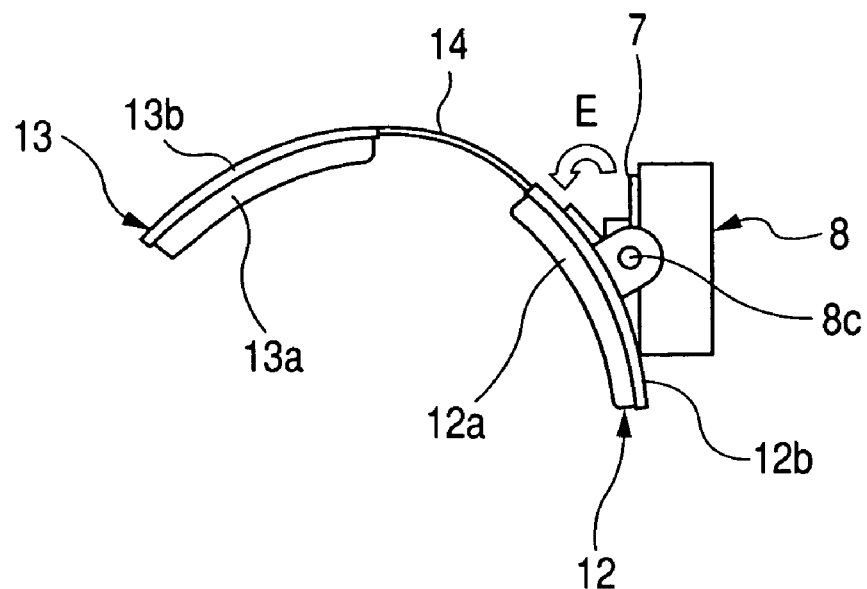
FIG. 9 is a side view of the back head pressing portion according to the third embodiment.
Figure 10:
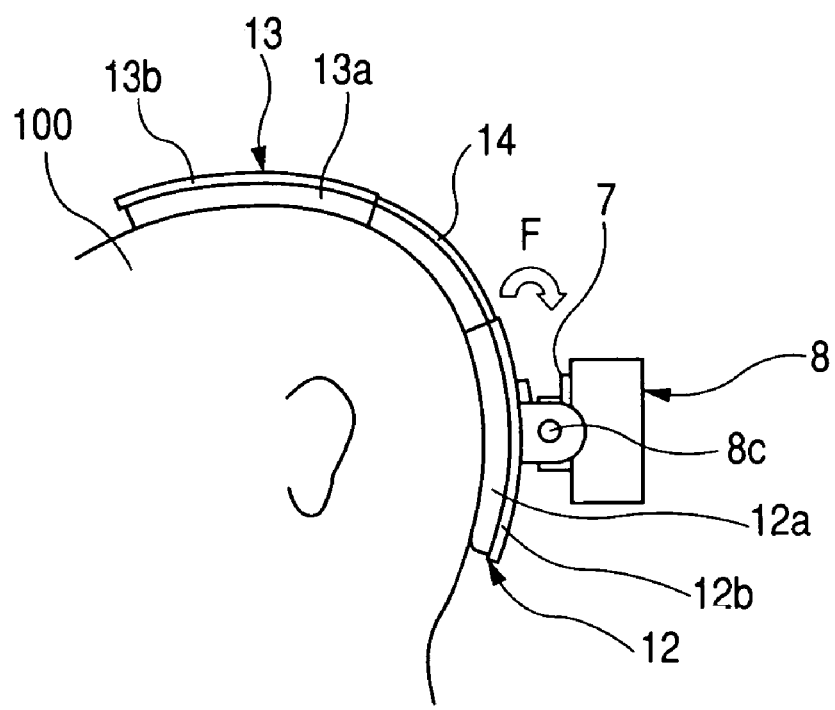
FIG. 10 is a side view showing the mounted state of the back head pressing portion according to the third embodiment.

FIG. 8 is a side view of the head mounted display (HMD) according to a third embodiment of the present invention, FIG. 9 is a side view of the back head pressing portion (head holding portion), and FIG. 10 is a side view of the back head pressing portion in the mounted state. In these drawings, the same numerals and symbols are used for the members which are the same as the members of the first embodiment, and the explanation thereof is omitted.

A back head pressing portion 12 is provided with: a back head pressing pad (a first pad) 12a abutting the back head of the wearing person when being mounted; and a back head pad mounting base (a supporting member) 12b to which the back head pressing pad 12a is mounted. In addition, a top head supporting portion 13 is provided with: a top head pressing pad (a second pad) 13a abutting on the top head of the wearing person when being mounted; and a top head pad mounting base (a supporting member) 13b to which the top head pressing pad 13a is mounted.

The back head pad mounting base 12b and the top head pad mounting base 13b are connected to each other via a top head frame (a supporting member) 14, and the top head pad mounting base 13b is operable together with the back head pad mounting base 12b. Here, the back head pad mounting base 12b, the top head frame 14, and the top head pad mounting base 13b are formed in the shape conforming to the shape of the head 100 of the wearing person.

When the HMD is in the non-mounted state, the back head pressing portion 12 receives the dead weight of a top head supporting portion 13 and the bias force of the bias spring 7 in a direction indicated by an arrow E in FIG. 9 so as to be held in a state in which the back head pad mounting base 12b abuts on the edge portion of the pad holding member 8. At this time, the back head pressing portion 12, just as the same as the back head pressing portion 6 in the first embodiment, is opened with respect to the head 100 of the wearing person. Note that it is possible to make the back head pressing portion 12 to be opened as mentioned above by a weight of the top head supporting portion 13 without providing the bias spring 7.

In the above-described manner, just as the first embodiment, in mounting the HMD, the back head pressing portion 12 is not reversed, thereby making it possible to securely make the abutting surface of the back head pressing pad 12a abut onto the head 100 of the wearing person.

When mounting the HMD, the back head pressing portion 12 and the top head supporting portion 13 move along the head 100 of the wearing person in accordance with the movement of the HMD in the direction of mounting. In addition, the bias spring 7 is charged in a direction indicated by an arrow F in FIG. 10 by being pressed into the back head pad mounting base 12b.

After moving the HMD to the predetermined position with respect to the head 100 of the wearing person, the distance between the back head pressing portion 12 and the front head pressing portion 3 is adjusted by using the length adjusting mechanism 5. As a result, the back head pressing portion 12 is pressed to the back head of the wearing person, to thereby making it possible to fix the HMD onto the head 100 of the wearing person.

In this embodiment, it is also possible to easily and smoothly mount the HMD without the back head pressing portion 12 being hooked on the head 100 of the wearing person. In addition, in mounting the HMD, it is not necessary to confirm the status (direction and the like) of the back head pressing portion 12.

Fourth Embodiment

Figure 11:
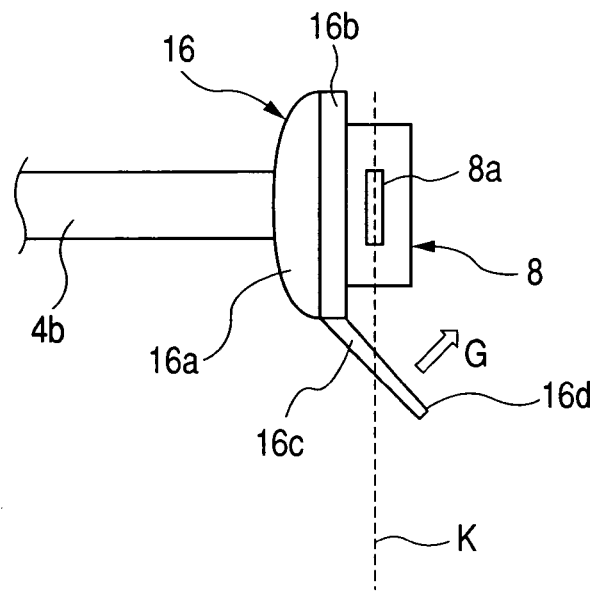
FIG. 11 is a side view of a part of the head mounted display which is a fourth embodiment of the present invention.
Figure 12:
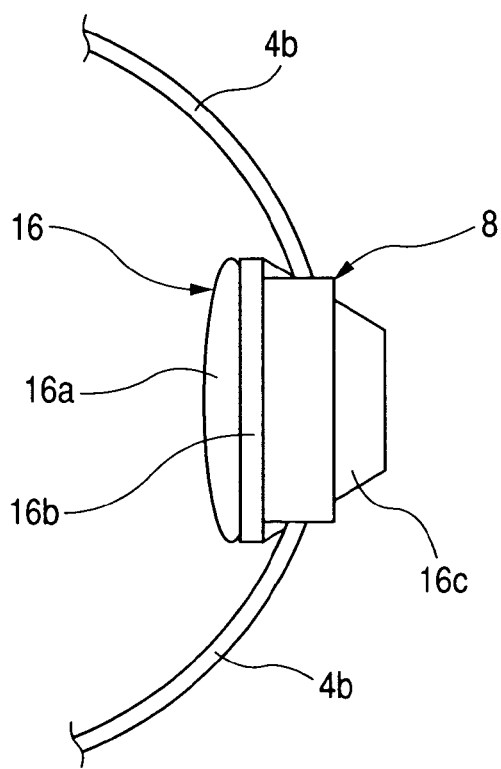
FIG. 12 is a partial top view of the head mounted display which is the fourth embodiment of the present invention.
Figure 13:
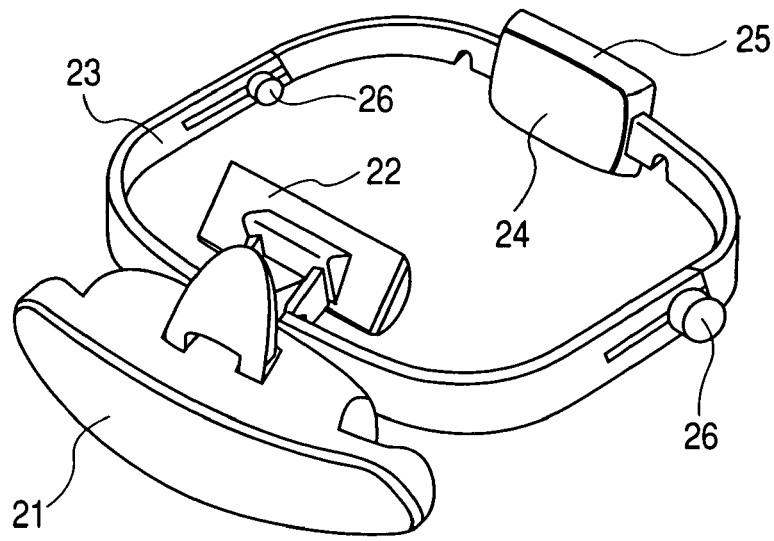
FIG. 13 is an external perspective view of a conventional head mounted display.
Figure 14:
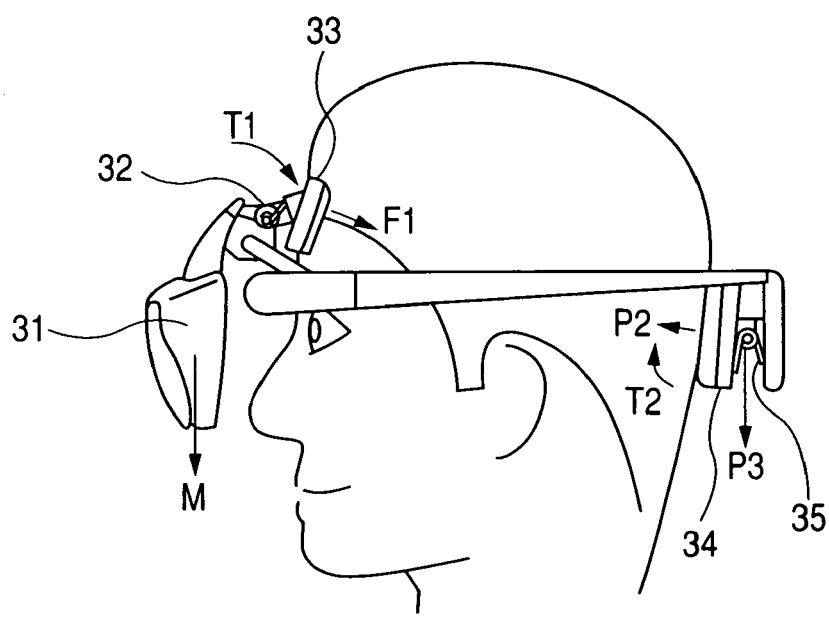
FIG. 14 is a view showing a mounted state of the conventional head mounted display.
Figure 15:
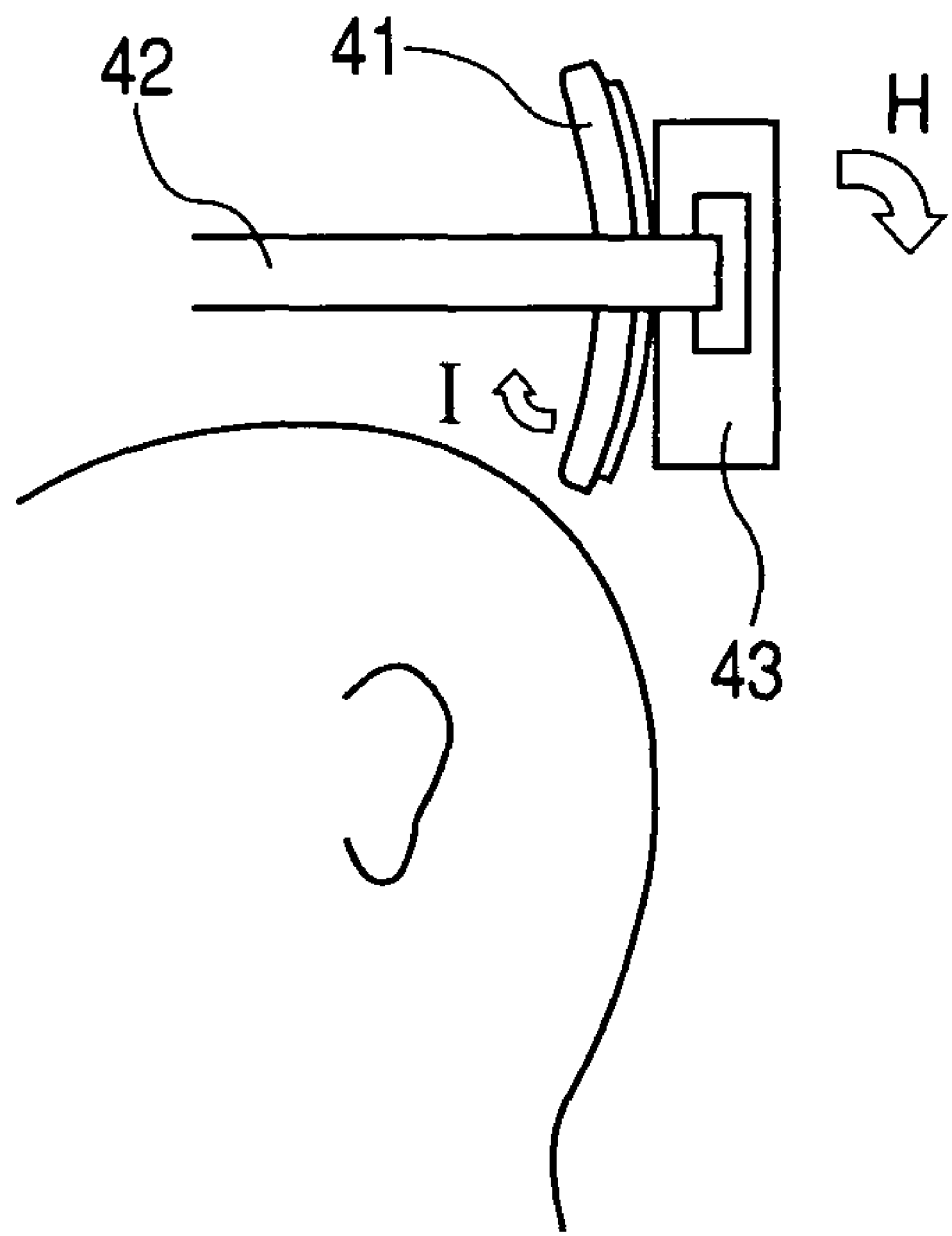
FIG. 15 is a view explaining a mounting operation of the back head pressing portion of the conventional head mounted display.

FIG. 11 is a side view showing a part of the HMD which is a fourth embodiment of the present invention, and FIG. 12 is a plan view (top view) showing a part of the HMD of this embodiment. In these drawings, only a part of the HMD is shown, and other configurations are the same as those in the first embodiment. In addition, the same numerals and symbols are used for the members which are the same as the members of the first embodiment, and the explanation thereof is omitted.

A back head pressing portion 16 is fixed onto the pad holding member 8. The back head pressing portion 16 is provided with a back head pressing pad 16a and a back head pad mounting base 16b on which the back head pressing pad 16a is mounted. In addition, a guide portion 16c is provided to the back head pad mounting base 16b.

The guide portion 16c extends to a side opposite to the side of the back head pressing pad 16a while maintaining a predetermined angle with respect to a plane including the back head pad mounting base 16b. In other words, the guide portion 16c, in the mounted state of the HMD, extends toward a direction opposite to a direction in which the back head pressing pad 16a is pressed to the back head (toward the outer side of the head).

Here, a tip 16d of the guide portion 16c is positioned on a side opposite to the side of the back head pad mounting base 16b with respect to a broken line K as shown in FIG. 11. The broken line K is a line orthogonal to the plane including the second frame 4b in the connecting portion 8a of the pad holding member 8.

In a case where a distance between the front head pressing portion 3 and the back head pressing portion 16 is small with respect to head of the wearing person, when mounting of the HMD is carried out, the guide portion 16c abuts on the head. At this time, the back head pressing portion 16 receives a force which rotates the back head pressing portion 16 in a direction indicated by an arrow G in FIG. 11 almost around the connecting portion 8a of the pad holding member 8 to which the second frame 4b is mounted.

However, the back head pressing portion 16 is connected to the pad holding member 8, and the pad holding member 8 is connected to the second frame 4b. Therefore, the back head pressing portion 16 does not rotate in the direction indicated by the arrow G even when the above-mentioned force is applied.

Here, in a case where it is not possible to move the HMD to the predetermined position with respect to the head of the wearing person, that is, in a case where the distance between the front head pressing portion 3 and the back head pressing portion 16 is small with respect to the head, the distance between the front head pressing portion 3 and the back head pressing portion 16 may be lengthened by changing the position of the second frame 4b with respect to the first frame 4a through the operation of the lock release button 15.

In the above-described manner, it is possible to mount the HMD onto the head. In addition, if the distance between the front head pressing portion 3 and the back head pressing portion 16 is long with respect to the head, the guide portion 16c moves along the head in accordance with the movement of the HMD in the direction of mounting (to the downward direction in FIG. 11), and the back head pressing pad 16a moves to the back head.

According to this embodiment, it is possible to guide the back head pressing portion 16 to the back head of the wearing person by the guide portion 16c, thereby making it possible to mount the HMD easily and smoothly. In addition, in mounting the HMD, it is not necessary to confirm the status (direction and the like) of the back head pressing portion 16.

Note that in the above embodiments, the explanation is made as to the HMD, however, the present invention can be applied to devices mountable on the head. That is, the back head pressing portions (6, 11, 12, and 16) as explained in each of the embodiments may be provided for the devices mountable on the head.

This application claims priority from Japanese Patent Application No. 2004-290103 filed Oct. 1, 2004, which is hereby incorporated by reference herein.

What is claimed is:

1. A head mounted device, comprising:
a frame extending from a front head side to a back head side in a mounted state when mounted onto a head; and
a head holding portion attached to the frame and provided with a pad that is pressed to the head in the mounted state;
wherein the head holding portion, in a non-mounted state in which the head mounted device is not mounted onto the head, holds the pad in a first orientation such that the pad is opened toward a mounting direction in which the head mounted device is mounted onto the head and such that the pad is inclined by a predetermined angle with respect to the mounting direction; and
wherein the head holding portion, in a mounted state in which the head mounted device is mounted onto the head, holds the pad in a second orientation that is rotated from the first orientation, such that the pad is pressed to a back portion of the head in the mounted state.

2. A head mounted device according to claim 1, wherein the head holding portion comprises a bias portion for applying a bias force to the pad for setting the pad to be opened toward the direction in which the head mounted device is mounted onto the head.

3. A head mounted device according to claim 1, wherein the head holding portion deformably holds the pad in a concave shape and a convex shape toward the head.

4. A head mounted device according to claim 1, wherein the head holding portion comprises:
a first pad pressed to the back head;
a second pad pressed to a top head; and
a supporting member for supporting the first pad and the second pad;
wherein the head holding portion holds the supporting member such that the first pad is opened toward the direction in which the head mounted device is mounted onto the head.

5. A head mounted device according to claim 4, wherein the head holding portion holds the first pad such that the first pad is opened toward the direction in which the head mounted device is mounted onto the head due to a dead weight of the second pad in the non-mounted state.

6. A head mounted device, comprising:
a frame extending from a front head side to a back head side in a mounted state onto a head; and a head holding portion attached to the frame and provided with a pad pressed to the head;

wherein the head holding portion comprises a guide member for guiding the pad to a pressing position on the head in a process of mounting the device onto the head; and wherein the guide member is extended in a direction opposite to a direction in which the pad is pressed to the head.

7. A head mounted system, comprising:

a frame extending from a front head side to a back head side in a mounted state when mounted onto a head;

a head holding portion attached to the frame and provided with a pad that is pressed to the head in the mounted state; and a head mounted instrument supported by the frame, wherein the head holding portion, in a non-mounted state in which the head mounted device is not mounted onto the head, holds the pad in a first orientation such that the pad is opened toward a mounting direction in which the head mounted device is mounted onto the head and such that the pad is inclined by a predetermined angle with respect to the mounting direction; and wherein the head holding portion, in a mounted state in which the head mounted device is mounted onto the head, holds the pad in a second orientation that is rotated from the first orientation, such that the pad is pressed to a back portion of the head in the mounted state.

8. A head mounted system, comprising:

a frame extending from a front head side to a back head side in a mounted state onto a head:

a head holding portion attached to the frame and provided with a pad pressed to the head; and a head mounted instrument supported by the frame;

wherein the head holding portion comprises a guide member for guiding the pad to a pressing position on the head in a process of mounting the device onto the head; and wherein the head mounted instrument comprises: an image forming element; and an optical system for guiding an image formed by the image forming element to an observer.

9. A head mounted system according to claim 7, wherein the head mounted instrument comprises: an image forming element; and an optical system for guiding an image formed by the image forming element to an observer.

* * * * *